(12) United States Patent
Hermansson et al.

(10) Patent No.: US 7,427,108 B2
(45) Date of Patent: Sep. 23, 2008

(54) HEAD RESTRAINT FOR MOTOR VEHICLE

(75) Inventors: Bengt Hermansson, Mullsjö (SE); Therese Nilsson, Mullsjö (SE); Urban Jägenstedt, Gränna (SE)

(73) Assignee: Kongsberg Automotive AB, Mullsjo (SE)

( * ) Notice: Subject to any disclaimer, the term of this patent is extended or adjusted under 35 U.S.C. 154(b) by 40 days.

(21) Appl. No.: 10/586,835

(22) PCT Filed: Jan. 19, 2005

(86) PCT No.: PCT/SE2005/000048

§ 371 (c)(1),
(2), (4) Date: Jul. 19, 2006

(87) PCT Pub. No.: WO2005/068251

PCT Pub. Date: Jul. 28, 2005

(65) Prior Publication Data

US 2007/0158990 A1    Jul. 12, 2007

(30) Foreign Application Priority Data

Jan. 19, 2004  (SE)  .................... 0400087

(51) Int. Cl.
*A47C 7/36*  (2006.01)
*A47C 7/38*  (2006.01)
(52) U.S. Cl. ...................... 297/408; 297/410
(58) Field of Classification Search ................ 297/408, 297/410
See application file for complete search history.

(56) References Cited

U.S. PATENT DOCUMENTS 4,256,341 A * 3/1981 Goldner et al. ............. 297/410

(Continued)

FOREIGN PATENT DOCUMENTS

DE         19839713  B4     3/2000

(Continued)

*Primary Examiner*—Rodney B. White
(74) *Attorney, Agent, or Firm*—Steven M. Jensen; Edwards Angell Palmer & Dodge LLP

(57) ABSTRACT

A head restraint (1) for use in motor vehicles and comprising a support (5) for supporting the head restraint and fixing the head restraint to the backrest of a vehicle seat, the support (5) comprising a carrier (12) and at least one support leg (14, 15) coupled to the carrier (12), together with an adjusting arrangement (6) for adjusting the position of the head restraint in relation to an occupant of the motor vehicle. The carrier (12) is enclosed by a casing (2), which is rotatably connected to the support (5) along an axis of rotation (18) running essentially at right angles to the support leg (14, 15). The adjusting arrangement (6) comprises a locking plate (22), and an operating element (7) acting upon the locking plate (22) and designed to carry the locking plate (22) in a direction essentially parallel to the axis of rotation (22), the locking plate (22) having one locking tongue (28) designed to interact with an adjusting arm (19) firmly connected to the casing (2) and having locking elements (21) defining at least two separate locking positions on the adjusting arm (19), and one locking tongue (26, 27) designed to interact with locking elements (20) arranged on the support leg (14, 15), defining at least two separate locking positions on the support leg (14, 15).

29 Claims, 3 Drawing Sheets

U.S. PATENT DOCUMENTS

| | | | |
|---|---|---|---|
| 4,304,439 A * | 12/1981 | Terada et al. | 297/408 X |
| 4,351,563 A | 9/1982 | Hattori | |
| 4,606,578 A * | 8/1986 | Yasui | 297/408 |
| 4,668,014 A * | 5/1987 | Boisset | 297/408 |
| 4,678,232 A * | 7/1987 | Ishida et al. | 297/408 |
| 4,693,515 A * | 9/1987 | Russo et al. | 297/408 X |
| 4,798,415 A * | 1/1989 | Tanino et al. | 297/410 |
| 4,830,434 A * | 5/1989 | Ishida et al. | 297/408 |
| 5,288,129 A * | 2/1994 | Nemoto | 297/410 |
| 6,899,395 B2 | 5/2005 | Yetukuri et al. | |
| 6,935,696 B2 * | 8/2005 | Gauthier et al. | 297/408 |
| 7,243,996 B2 * | 7/2007 | Daniels | 297/408 X |

FOREIGN PATENT DOCUMENTS

| | | |
|---|---|---|
| EP | 0970846 A1 | 1/2000 |

* cited by examiner

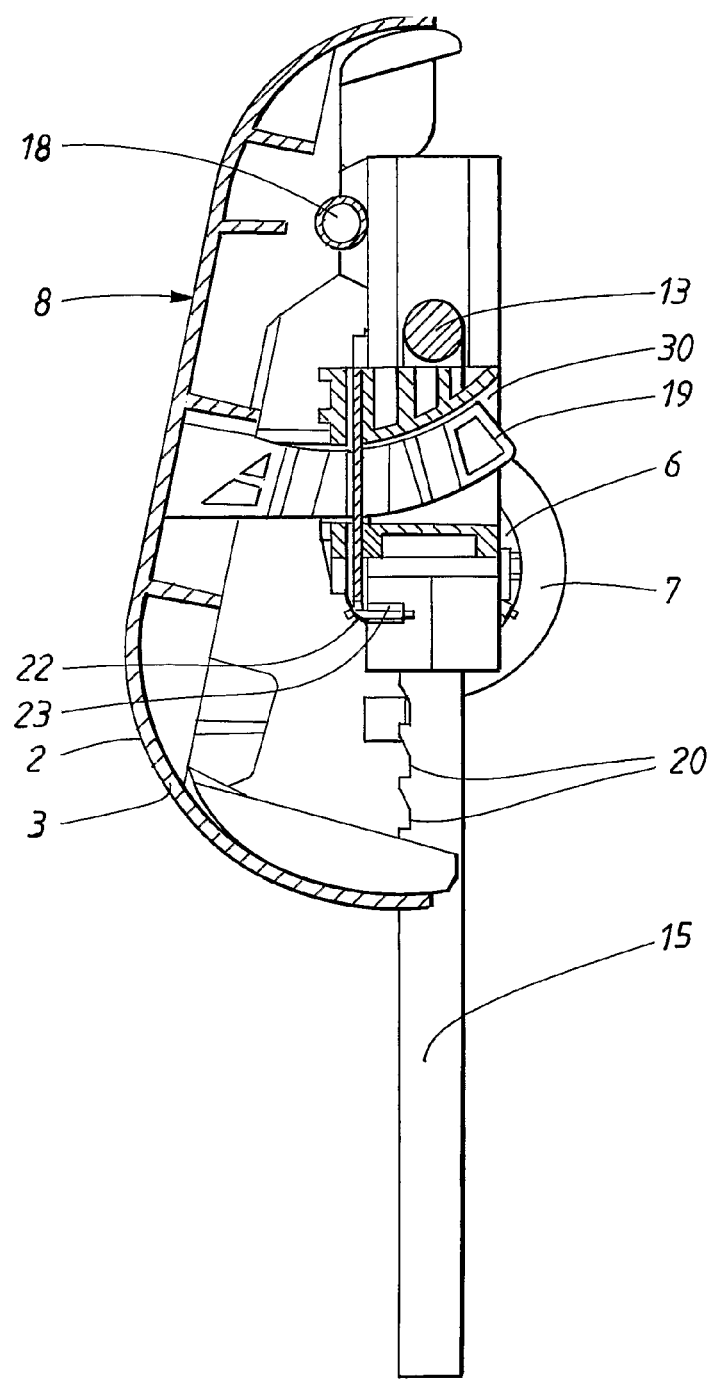
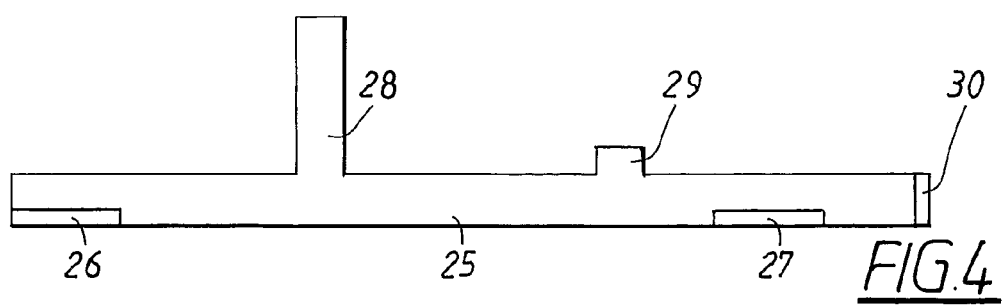

HEAD RESTRAINT FOR MOTOR VEHICLE

FIELD OF THE INVENTION

The present invention relates to a head restraint for use in motor vehicles and comprising a support for supporting the head restraint and fixing the head restraint to the backrest of a vehicle seat, the support comprising a carrier and at least one support leg coupled to the carrier, together with an adjusting arrangement for adjusting the position of the head restraint in relation to an occupant of the motor vehicle, and the carrier being enclosed by a casing which is rotatably connected to the support along an axis of rotation running essentially at right angles to the support leg.

DESCRIPTION OF THE PRIOR ART

In order to prevent neck injuries, for example in collisions, it has long been usual to provide cars and other motor vehicles with head restraints. In many countries there is a statutory requirement to provide such head restraints, for example in passenger cars. There are also statutory regulations governing the design and strength of head restraints.

In order that the head restraints will function optimally both from the point of view of comfort and from the safety standpoint, they should be adjustable so that they can be adjusted individually for each occupant of the vehicle. There is therefore a desire to be able to adjust both the height and the angle of the head restraint in relation to the occupant's head. It is not uncommon for the occupant to want to alter the angling of the head restraint separately whilst the vehicle is underway. Since the head restraint is then in a position in relation to the occupant in which it is no longer visible to the occupant, it is particularly desirable that the adjusting mechanism be sufficiently easy to understand and operate that the head restraint can be adjusted without the occupant needing to turn round.

For safety reasons it is moreover advantageous if the height and angle adjustment can be locked in the set position, so that the adjustment cannot be accidentally changed.

It has hitherto been necessary to operate two different adjusting arrangements in order to alter both the height and angle of the head restraint. There is therefore a need for a head restraint having a simple and convenient adjusting mechanism, which can be operated whilst underway and without having to be able to see the mechanism. There is furthermore a need for a head restraint having an adjusting mechanism which will permit both height and angular adjustment of the head restraint.

SUMMARY OF THE INVENTION

The present invention has now produced a head restraint of the type described in the introductory part, which permits easy and flexible adjustment of the height and angling. The head restraint according to the invention is primarily distinguished by the fact that the adjusting arrangement comprises a locking plate and an operating element acting upon the locking plate, designed to carry the locking plate in a direction essentially parallel to the axis of rotation, the locking plate having one locking tongue designed to interact with an adjusting arm connected to the casing and having locking elements defining at least two separate locking positions on the adjusting arm, and one locking tongue designed to interact with locking elements arranged on the support leg, defining at least two separate locking positions on the support leg.

Arranging locking tongues having different functions on one and the same locking plate therefore makes it possible, by operating the locking plate, to release and to lock both a height adjustment function and an angling function by means of one and the same operating element. The location of the locking tongues on the plate controls the interaction of the plate with the adjusting arm connected to the casing and with the locking elements on the support leg. It is possible, for example, to locate the locking tongues in such a way that the plate can be moved to a first position, in which the one function is locked and the other released, and a second position, in which the opposite applies. Since the height of the head restraint is generally only adjusted once at the start of a journey, whilst the occupant may wish to alter the angling several times whilst underway, it is usually advantageous for the first position to permit height adjustment and the second position to permit adjustment of the angling.

The head restraint is commonly fixed to a vehicle seat by two support legs. According to one embodiment of the invention the support therefore comprises two support legs, which each have locking elements, defining at least two separate locking positions on each support leg. The locking plate accordingly has two locking tongues, which are each designed to interact with the locking elements on a support leg. The locking plate is preferably designed to be moved sideways through the head restraint in an essentially horizontal direction. It is therefore advisable that the locking positions, which on each support leg are intended for adjusting the head restraint to a certain height, be arranged on the same level in relation to one another. Alternatively it is naturally feasible for the locking elements on the support legs to be arranged at different heights to one another and designed to interact with locking tongues, which are correspondingly arranged at different locking plate heights.

One simple and efficient way of producing defined locking positions is to arrange notches in the adjusting arm and in the support leg or support legs. Such notches may be formed, for example, during casting of the adjusting arm leg or the support legs. Alternatively the notches can be milled out subsequently. Operating the adjusting arrangement moves the locking tongues on the locking plate into and out of the notches, thereby locking and releasing the adjusting arm and the support legs. Another type of locking position-defining elements are tenons, between which the locking tongues can be introduced.

According to one embodiment of the invention the adjusting arm is curved, with a radius of curvature suitably corresponding to the radius of a circle around the axis of rotation of the head restraint, the circle being situated at the same distance from the axis of rotation as the adjusting arm.

In order to control and stabilize the angling movement the adjusting arm suitably runs in a curved channel in the carrier. The channel is suitably of a shape and size matching the shape and size of the adjusting arm. The adjusting arm may have any suitable cross-sectional shape, for example rectangular, square, circular, oval etc.

Both the carrier and the casing and the adjusting arm are advantageously formed from rigid plastic. This means that these parts can readily be injection moulded. The adjusting arm and a front part of the casing are then suitably integrally formed. It is also possible, however, to use other materials, preferably metal, for forming any or some of the said parts. Combinations of materials are naturally also possible.

Correspondingly, the support leg or support legs are suitably composed of metal, but combinations of metal and plastic are also possible. Like the adjusting arm, the support legs of the head restraint may be of any suitable cross-sectional shape, for example, rectangular, oval or circular.

The casing is advantageously formed from rigid plastic and is arranged at least over a front section of the head restraint. However, the casing preferably fully encloses the internal parts of the adjusting mechanism. It is then advisable to form the casing with a front part and a rear part. At least the front part of the casing is usually also covered by a cushion of shock-absorbent foam plastic, such as polyethylene foam. An outer cover, such as a covering of the same material as the rest of the vehicle upholstery, may be arranged on top of the foam plastic cushion.

According to a preferred embodiment of the invention the adjusting arrangement has a first operating position and a second operating position.

The operating positions can thereby be suitably arranged so that the first operating position permits adjustment of the height of the head restraint and the second operating position permits adjustment of the angling of the head restraint. The first operating position is then arrived at by movement of the locking plate to an inner limit position, past which the locking plate cannot be displaced, and the second operating position is arrived at by movement of the locking plate to a position between the inner limit position and the outer limit position. The outer limit position constitutes a neutral position in which both the height adjustment function and the angling function are locked. When the locking plate is in the second operating position it is only possible to adjust either the height or the angle of the head restraint.

According to one embodiment of the invention the operating element comprises a pushbutton control which is designed to act upon the locking plate and to displace the locking plate for operating the adjusting arrangement. The pushbutton control may function purely mechanically, in that depressing the pushbutton control directly shifts the locking plate between the operating positions. Alternatively the pushbutton control may be coupled to an electrically powered motor, which actuates the locking plate.

In order to ensure that the height and angling functions are locked when they are properly adjusted to the desired position, the adjusting arrangement suitably comprises means for returning the locking plate to a neutral position in which adjustment of the height and angling of the head restraint is not possible. In its simplest form such means may be a knob or the like, which is manually pulled out to the neutral position. However, the means of return is preferably a spring, such as a leaf spring which continuously exerts a return force on the locking plate. With such an arrangement the locking plate will always return to the neutral position as soon as the adjustment of the head restraint is completed.

DESCRIPTION OF THE DRAWINGS

The invention will now be described in more detail below with reference to the figures shown in the drawings attached, in which:

FIG. 3 shows a side view of the head restraint of FIG. 2 viewed in cross section, and FIG. 4 shows an isolated view of a locking plate according to the invention.

DETAILED DESCRIPTION OF AN EMBODIMENT

Figure 1:
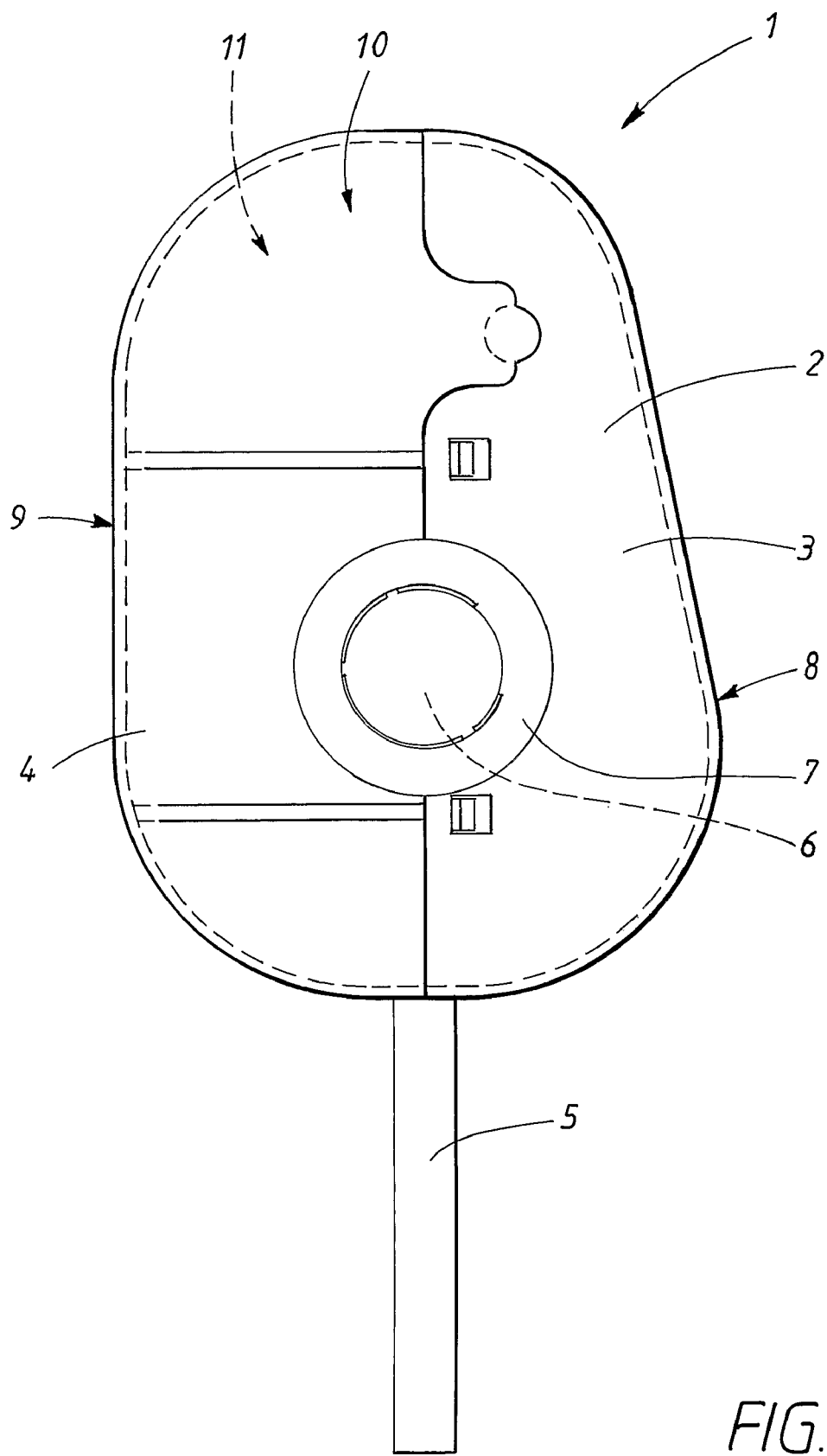
FIG. 1 shows a side view of a head restraint according to the invention.

FIG. 1 shows a head restraint 1 without the shock-absorbent cushion that usually covers the outside of a head restraint. Such a cushion may be made, for example, from a dimensionally stable polyethylene foam or similar material.

Figure 2:
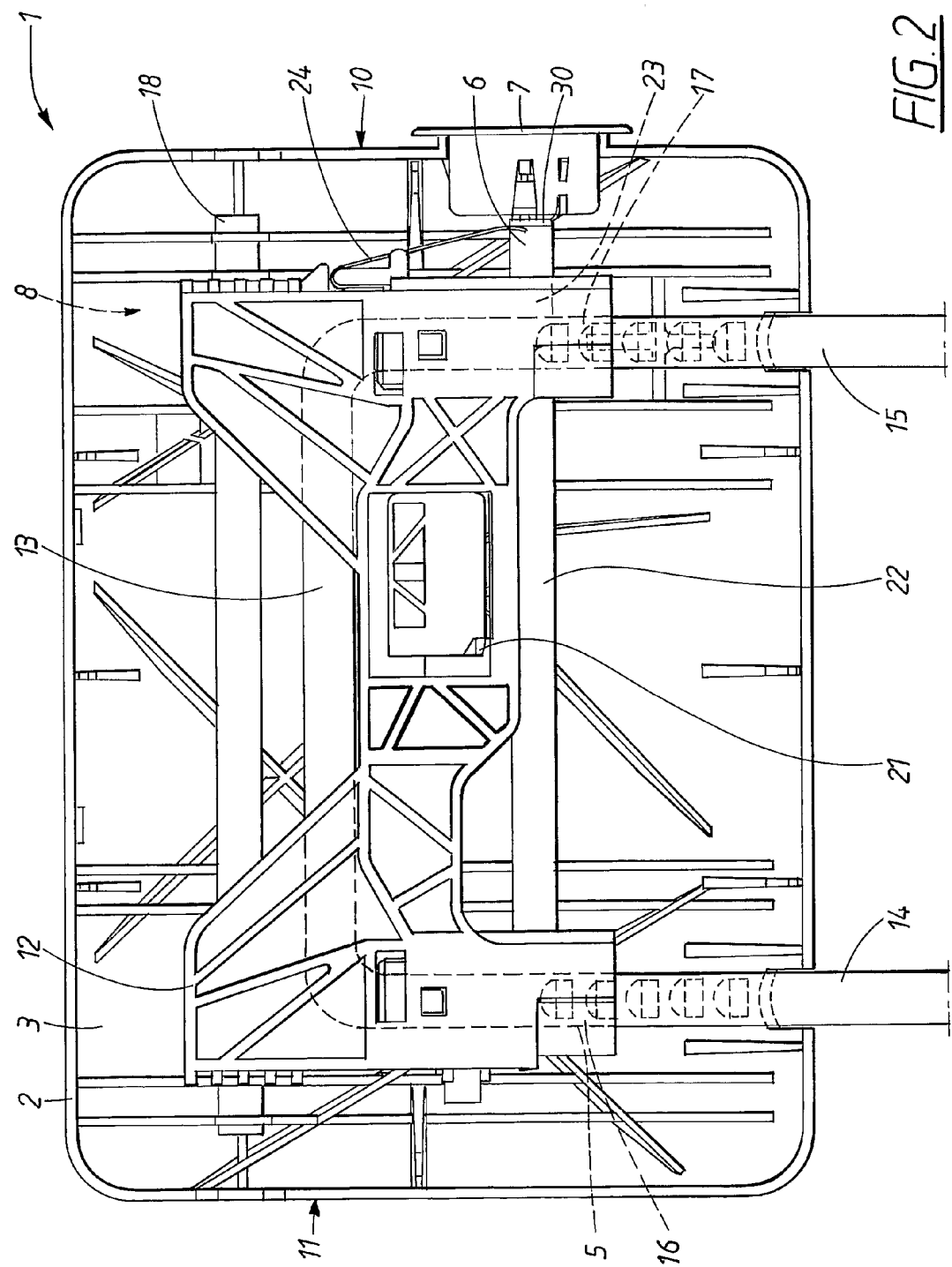
FIG. 2 shows a rear view of the head restraint of FIG. 1 according to the invention.

Visible in FIG. 1 are a casing 2 comprising a front part 3, intended to be turned towards an occupant of a vehicle, and a rear part 4, intended to be turned away from the occupant. The casing 2 may be made, for example, of rigid plastic, or some other dimensionally stable impact-resistant material. In order to increase the stability in the casing 2, it may be designed, as shown in FIG. 2, with a stiffening internal framework. Such a framework in a plastic casing is suitably produced in conjunction with the forming of the actual casing. The casing 2 is shown in a side view and partially encloses a support 5, by way of which the head restraint can be fixed to a vehicle seat (not shown), and an adjusting arrangement 6. The adjusting arrangement 6 can be operated by means of an operating element in the form of a pushbutton control 7. The head restraint 1 has a front side 8, a rear side 9 and two lateral surfaces 10, 11. The pushbutton control 7 is then arranged on one of the lateral surfaces 10. The pushbutton control 7 is usually arranged on the lateral surface 10 situated on the left-hand side of the occupant. In this way the pushbutton control 7 can be operated with the left hand, whilst the adjustment of the head restraint 1 can be undertaken with the right hand.

In FIG. 2 the rear part 4 of the casing 2 has been removed so as to reveal the interior of the head restraint 1. It can be seen from this that the support 5 comprises a carrier 12, which is coupled to a frame 13 having two vertical support legs 14, 15. The support legs 14, 15 run in channels 16, 17 in the carrier 12 and thereby allow the carrier 12 and the casing 2 to be pushed upwards and downwards on the support legs 14, 15. The carrier may be formed from rigid plastic, metal or the like and the frame 13 is suitably a metal frame, of steel for example.

The casing 2 is pivotally connected to the carrier 12 by way of a horizontal axis 18, so that the casing 2 can be swivelled forwards and backwards, thereby adjusting the angle between the support legs 14, 15 and the casing 2. A curved adjusting arm 19 is firmly connected to the casing 2, for example by being integrally moulded with the front part 3 of the casing 2. In the exemplary embodiment shown the adjusting arm 19 has an essentially rectangular cross-sectional shape, but it may naturally be formed with any other suitable shape, for example oval or circular. The adjusting arm 19 is curved, with a radius of curvature corresponding to the radius of a circle around the horizontal axis 18, the circle being situated at the same distance from the axis 18 as the adjusting arm 19. The adjusting arm 19, as will best be seen from FIG. 3, runs in a channel 30 through the carrier 12 and constitutes a part of the adjusting arrangement 6. The channel 30 has a shape and periphery corresponding to the shape and periphery of the adjusting arm 19, and control and rotation of the casing around the horizontal axis 18 can be performed smoothly and stably.

In order to allow locking of the head restraint 1 in various height positions, the support legs 14, 15 are provided with locking notches 20, which define separate locking positions. In the exemplary embodiment shown, the locking notches 20 are arranged on that side of each support leg 14, 15 facing the front side 8 of the head restraint. Other locations are obviously feasible without departing from the scope of the invention.

Locking notches 21 are correspondingly arranged in the adjusting arm 19, so that the angling of the head restraint 1 can be locked in predefined locked positions corresponding to the locking notches 21. The locking notches 21 are suitably arranged on a side surface of the adjusting arm 19. In the example shown the locking notches 21 are arranged in the side of the adjusting arm 19 facing the pushbutton control 7.

The locking notches 20, 21 interact with a locking plate 22, which runs in a groove 23 in the carrier 12. The locking plate 22 is connected to the pushbutton control 7 and can be moved to and for sideways through the groove 23 in the carrier 12. By depressing the pushbutton control 7 the locking plate is therefore brought towards the lateral surface 11 of the casing 2 opposite the pushbutton control 7. When the pushbutton control 7 is no longer depressed, the locking plate is returned to its original position by the action of a leaf spring 24 arranged between the carrier 12 and the locking plate 22.

As shown most clearly in FIG. 4, the locking plate 22 comprises an essentially rectangular rail 25, preferably of metal. Two outwardly angled locking tongues 26, 27, which are intended to interact with the locking notches 20 on the support legs 14, 15, are arranged on the rail 25. The outwardly angled locking tongues 26, 27 are shown located in the lower edge of the rail 25, but obviously may alternatively be located in the upper edge, or anywhere on the surface between the edges. A further locking tongue 28 is located between the two outwardly angled locking tongues and projects vertically from the rail 25 and is designed to interact with the locking notches 21 on the adjusting arm 19. In alternative embodiments the vertical locking tongue 28 may also be located in a position other than that shown here. In addition the locking plate 22 is provided with a guide flange 29, which makes it easier for the locking plate 22 to run smoothly in the groove 23 in the carrier 12. At the end of the locking plate 22 which is intended to be located on the pushbutton control, the rail 25 is bent, so that it has an end plate 30. The leaf spring 24, as can best be seen from FIG. 2, is located so that it is clamped between the end plate 30 and the carrier 12.

When the adjusting arrangement 6 is in neutral position, that is to say with the locking plate 22 brought fully out towards the lateral surface 10 on which the pushbutton control is arranged, it is not possible to adjust either the height or the angling of the head restraint 1. In the neutral position the outwardly angled locking tongues 26, 27 are inserted into locking notches 20 on the support legs 14, 15, and the vertical locking tongue 28 is inserted into a locking notch 21 on the adjusting arm 19. By depressing the pushbutton control 7, the locking plate 22 is carried sideways until the vertical locking tongue is released from the locking notch 21 on the adjusting arm. This makes it possible to adjust the angling of the head restraint 1. In this position a part of the outwardly angled locking tongues 26, 27 is still inserted in locking notches 20 on the support legs 14, 15, which means that the height adjustment function is locked. By further depressing the pushbutton control 7 the locking plate is moved further sideways until the outwardly angled locking tongues 26, 27 also leave the locking notches 20 on the support legs 14, 15. In this position the head restraint 1 can be moved upwards and downwards on the support legs 14, 15, so that the height of the head restraint can be adjusted.

After having performed the desired height and angle adjustments, the adjusted position of the head restraint can be locked by releasing the pushbutton control 7. The locking plate 22 is thereby automatically returned by the leaf spring 24 to the original neutral position, in which both the height adjustment function and the angling function are locked. One advantage of the design construction shown is that the locking notches 20 on the support legs 14, 15 are completely hidden inside the casing 2. This means that the visible parts of the support legs can be designed with an aesthetically pleasing appearance.

In the exemplary embodiment described here, therefore, the adjusting arrangement 6 has a first, inner adjustment position in which the height of the head restraint is adjusted, and a second outer adjustment position in which only the angling can be adjusted. Such an arrangement is advantageous, since it means that the height can be adjusted by the occupant at the start of a journey and that the angling can then be repeatedly adjusted whilst underway, without affecting the height adjustment. As stated earlier, each occupant usually only wishes to adjust the height of the head restraint once, whereas for reasons of comfort it may be necessary to adjust the angling of the head restraint several times. However, the invention is not limited to the arrangement described but also encompasses variants in which the first adjustment position is an angling adjustment position and the second adjustment position is a height adjustment position. The sequence of the adjustment positions is determined by the location of the locking tongues 26, 27, 28 on then locking plate 22 in relation to one another and in relation to the locking notches 20, 21 on the support legs 14, 15 and on the adjusting arm 19, and by the width ratio between the outwardly angled locking tongues 26, 27 and the vertical locking tongue 28. In the example shown, therefore, the outwardly angled locking tongues 26, 27 are wider than the vertical locking tongue 28.

The example shown describes a head restraint which can be swivelled about an axis 18 located in the upper part of the head restraint, that is to say having a pivot point situated high up. Naturally it is alternatively possible to apply the invention to head restraints having a low pivot point.

The invention claimed is:

1. A head restraint for use in motor vehicles, comprising:
   a support including at least one support leg for fixing the head restraint to a vehicle seat;
   an adjusting arrangement operable to adjust at least an angle and a height of the head restraint in relation to the vehicle seat, the adjusting arrangement having a plurality of positions arranged in a predetermined order of a non-operating position that prevents adjustment of the angle and the height of the head restraint, a first operating position that permits adjustment of the angle of the head restraint, and a second operating position that permits adjustment of the height of the head restraint; and
   the adjusting arrangement including a locking plate and an operating element operably connected to the locking plate for selecting one of the plurality of positions, the plurality of positions being selectable in the predetermined order,
   wherein in the first operating position, the angle of the head restraint is adjustable while the height of the head restraint remains locked, the angle being adjustable by engaging the locking plate with an adjusting arm having a plurality of predefined locking positions, and
   in the second operating position, the height of the head restraint is adjustable by engaging the locking plate with the at least one support leg having a second plurality of locking positions.

2. The head restraint of claim 1, wherein the operating element is operated in one dimension to select at least one of the plurality of positions.

3. The head restraint of claim 1, wherein the operating element comprises a pushbutton.

4. The head restraint of claim 3, wherein the first operating position of the adjusting arrangement is selectable by depressing the pushbutton, and the second operating position of the adjusting arrangement is selectable by further depressing the pushbutton.

5. The head restraint of claim 4, wherein the adjusting arrangement returns to the non-operating position upon release of the pushbutton.

6. The head restraint of claim 4, further comprising a biasing mechanism connected to the pushbutton for returning the adjustment mechanism to the non-operating position upon release of the pushbutton.

7. The head restraint of claim 1, wherein the head restraint is supported by a carrier operably coupled to the at least one support leg.

8. The head restraint of claim 1, wherein the at least one support leg includes a plurality of locking elements corresponding to the second plurality of locking positions.

9. The head restraint of claim 1, wherein the at least one support leg comprises two support legs having a plurality of locking elements defining locking height positions of the head restraint.

10. The head restraint of claim 9, wherein the locking plate includes a locking tongue for engaging the locking elements on the support legs.

11. The head restraint of claim 1, wherein the head restraint is supported by a carrier at least partially enclosed by a casing, the casing being pivotally connected to the carrier.

12. The head restraint of claim 11, wherein at least one of the carrier and the casing is made of rigid plastic.

13. The head restraint of claim 11, wherein the adjusting arm is received in a curved channel of the carrier.

14. The head restraint of claim 1, wherein the locking plate includes a locking tongue for being received in notches corresponding to the plurality of locking positions of the adjusting arm.

15. The head restraint of claim 1, wherein the adjusting arm is curved.

16. The head restraint of claim 1, wherein the adjusting arm includes a plurality of notches defining the locking positions of the head restraint.

17. A motor vehicle seat comprising the head restraint of claim 1.

18. A motor vehicle comprising the head restraint of claim 1.

19. A head restraint for use in motor vehicles, comprising:
a support including at least one support leg for fixing the head restraint to a vehicle seat;
an adjusting arrangement operable to adjust at least an angle and a height of the head restraint in relation to the vehicle seat, the adjusting arrangement having a plurality of positions including a non-operating position that prevents adjustment of the angle and the height of the head restraint, a first operating position that permits adjustment of the angle of the head restraint, and a second operating position that permits adjustment of the height of the head restraint; and
the adjusting arrangement including a locking plate and an operating element operably connected to the locking plate for selecting one of the plurality of positions such that the second operating position is selectable in order only after the first operating position,
wherein in the first operating position, the angle of the head restraint is adjustable while the height of the head restraint remains locked, the angle being adjustable by engaging the locking plate with an adjusting arm having a plurality of predefined locking positions, and in the second operating position, the height of the head restraint is adjustable by engaging the locking plate with a plurality of locking elements arranged in the at least one support leg.

20. The head restraint of claim 19, wherein the operating element is operated in one dimension to select at least one of the plurality of positions.

21. The head restraint of claim 19, wherein the operating element comprises a pushbutton.

22. The head restraint of claim 21, wherein the first operating position of the adjusting arrangement is selectable by depressing the pushbutton, and the second operating position of the adjusting arrangement is selectable by further depressing the pushbutton.

23. The head restraint of claim 21, wherein the adjusting arrangement returns to the non-operating position upon release of the pushbutton.

24. A method for adjusting a head restraint in a motor vehicle, comprising the steps of:
providing a support including at least one support leg for fixing the head restraint to a vehicle seat;
providing an adjusting arrangement for adjusting at least an angle and a height of the head restraint in relation to the vehicle seat, the adjusting arrangement having a plurality of positions including a non-operating position that prevents adjustment of the angle and the height of the head restraint, a first operating position that permits adjustment of the angle of the head restraint, and a second operating position that permits adjustment of the height of the head restraint;
providing the adjusting arrangement with a locking plate and an operating element operably connected to the locking plate for selecting one of the plurality of positions;
operating the operating element to select the first operating position of the adjusting arrangement for adjusting the angle of the head restraint by engaging the locking plate with an adjusting arm having a plurality of predefined locking positions; and
operating the operating element to select the second operating position of the adjusting arrangement for adjusting the height of the head restraint by engaging the locking plate with the at least one support leg having a second plurality of locking positions,
wherein the step of operating the element to select the second operating position occurs only after the step of operating the operating element to select the first operating position.

25. The method of claim 24, wherein the operating element is operated in one dimension to select at least one of the plurality of positions.

26. The method of claim 24, wherein the operating element comprises a pushbutton.

27. The method of claim 26, wherein the first operating position of the adjusting arrangement is selectable by depressing the pushbutton, and the second operating position of the adjusting arrangement is selectable by further depressing the pushbutton.

28. The method of claim 26, wherein the adjusting arrangement returns to the non-operating position upon release of the pushbutton.

29. The method of claim 24, wherein in the first operating position, the angle of the head restraint is adjustable while the height of the head restraint remains locked.

* * * * *